United States Patent
Muzik et al.

(10) Patent No.: US 6,179,131 B1
(45) Date of Patent: Jan. 30, 2001

(54) FUSION-WELDED THERMOPLASTIC FILTER ASSEMBLY AND A METHOD OF FABRICATING THE SAME

(75) Inventors: Thomas A. Muzik, Thousand Oaks; Kevin J. Knebel, Simi Valley, both of CA (US)

(73) Assignee: PTI Technologies, Inc., Newbury Park, CA (US)

( * ) Notice: Under 35 U.S.C. 154(b), the term of this patent shall be extended for 0 days.

(21) Appl. No.: 09/104,236

(22) Filed: Jun. 25, 1998

(51) Int. Cl.[7] .............................. B01D 27/08; B01D 35/30
(52) U.S. Cl. ............................. 210/437; 55/510; 156/73.1; 210/455; 210/457; 210/484; 210/493.2; 210/497.01
(58) Field of Search ..................................... 210/437, 446, 210/455, 457, 484, 497.01, 493.2; 55/510; 156/73.1

(56) References Cited

U.S. PATENT DOCUMENTS

| | | |
|---|---|---|
| 2,553,259 | 5/1951 | Hagedom . |
| 2,649,392 | 8/1953 | Marshall . |
| 3,583,458 | 6/1971 | Costa . |
| 3,706,176 | 12/1972 | Leatherman . |
| 3,786,925 * | 1/1974 | Block et al. . |
| 3,923,580 | 12/1975 | Leatherman . |
| 4,222,974 | 9/1980 | Smith . |
| 4,234,781 | 11/1980 | Flink . |
| 4,479,874 * | 10/1984 | Rosenberg . |
| 4,514,242 | 4/1985 | MacLaughlin et al. . |
| 4,588,464 | 5/1986 | Miyagi et al. . |
| 4,601,927 | 7/1986 | Durfee . |
| 4,664,801 | 5/1987 | Thomas . |
| 4,725,323 | 2/1988 | Ostreicher et al. . |
| 4,956,089 | 9/1990 | Hurst . |
| 5,015,316 | 5/1991 | Ostreicher et al. . |
| 5,114,508 | 5/1992 | Miyagi et al. . |
| 5,130,023 | 7/1992 | Feint . |
| 5,143,575 | 9/1992 | Glassel et al. . |
| 5,225,077 * | 7/1993 | Feint . |
| 5,336,405 | 8/1994 | Tang et al. . |
| 5,444,814 | 8/1995 | Hofius, Sr. . |
| 5,531,848 | 7/1996 | Brinda et al. . |
| 5,543,002 | 8/1996 | Brinda et al. . |
| 5,779,903 * | 7/1998 | Smith et al. .................. 210/440 |
| 5,855,780 * | 1/1999 | Dye . |

* cited by examiner

*Primary Examiner*—Matthew O. Savage
*Assistant Examiner*—Michael Fleming
(74) *Attorney, Agent, or Firm*—Pillsbury Madison & Sutro LLP

(57) ABSTRACT

A fusion-welded thermoplastic assembly and a method of fabricating the same includes first and second thermoplastic members fusion-welded together using a third thermoplastic fusion element. The first and second thermoplastic members and the thermoplastic fusion element are heated to a molten state using an infrared heater, and the molten fusion element is fused to each of the first and second thermoplastic elements. Prior to being connected by the fusion element, the first and second thermoplastic members are either brought into contact with one another or is held in such a way that they can be connected to each other using the third thermoplastic fusion element.

9 Claims, 6 Drawing Sheets

FUSION-WELDED THERMOPLASTIC FILTER ASSEMBLY AND A METHOD OF FABRICATING THE SAME

BACKGROUND OF THE INVENTION

1. Field of Invention

The present invention relates assemblies of two or more thermoplastic components, and in particular, to a method for connecting two or more thermoplastic components together by an improved fusion-welding technique and to an improved fusion-welded assembly.

2. Description of the Related Art

One of the notable advantages of thermoplastic materials, such as, for example polyethylene, perfluoroalkoxy, hexafluoropropylene, polypropylene, and polyvinyldifluoride, in fabricating many industrial products is that, in many instances, components made of such materials can be welded together to form assemblies. There are many methods known in the plastic arts for welding thermoplastic components together. For example, the filter cartridge industry has used various welding techniques to fabricate filter cartridges, comprising thermoplastic housings and thermoplastic-encased filter elements, including spin-welding, contact-welding, injection-welding, and fusion-welding. In fusion welding, the mating surfaces of two or more thermoplastic components are heated to a molten state, or "wetted", for example, by an infrared (IR) heating device, before the components are mated together. After heating the mating surfaces, but before the surfaces cool, the components are pressed together so that the wetted mating surfaces of the components contact one another. As the mating surfaces cool, they fuse together forming an intermingled thermoplastic interface, thus securing the components to one another.

Of the various thermoplastic welding techniques known, many skilled in the art prefer IR fusion-welding methods because of certain advantages provided by such methods. One known advantage of IR fusion-welding is that it produces a stronger bond between welded components than that produced by other thermoplastic welding techniques, because infrared radiation heats the thermoplastic materials internally and penetrates deeper into the thermoplastic materials. Accordingly, the resulting fusion bond between the welded components provides more than a mere adhesion of the component surfaces. Another appreciated advantage of IR fusion-welding over other thermoplastic welding techniques is that IR fusion-welding methods do not produce undesirable by-products or debris, which is especially important when a production environment is required to be clean. For example, many skilled in the art of filter cartridge manufacturing prefer IR fusion-welding over alternative welding techniques, such as spin-welding, in which debris is created while generating the necessary frictional heat through spinning of the thermoplastic components relative to one another. IR fusion-welding may also be preferred over contact-welding methods, because some contact-welding applications tend to melt the thermoplastic components excessively.

Despite its known and appreciated advantages, including, but not limited to the above, the inventors of the present invention have found the use of conventional IR fusion-welding techniques to be either impracticable or inefficient in certain situations. For instance, the inventors have found conventional IR fusion-welding methods to be unsuitable when the thermoplastic components to be welded have complex non-coplanar geometries which make it difficult, if not impossible, to apply plastic-melting radiation to only the mating surface of one or more of the thermoplastic components to be welded together without applying too much radiation to other surfaces of the component. This situation arises when the shape of a thermoplastic component to be welded is such that when the mating surface of the component is presented to the IR heating device for wetting the mating surface prior to welding, another surface of the component which forms no part of the mating surface is actually closer to the IR heating device than the mating surface. Thus, the closer surface is heated, and perhaps overheated and damaged, before the mating surface is sufficiently wetted.

FIG. 6 illustrates one such example. A first thermoplastic member shown in FIG. 6 is a cylindrical member 22 having a sidewall 24 and radial endwall 26 with a bore 28 formed in its center. A second thermoplastic member is an insert 10 having a cylindrical body 12, sized and shaped to fit within the bore 28, with a peripheral, radially-extending flange 14. The insert may have a closed bottom surface 30 as shown, or the insert may have an open end. A mating surface 16 of the insert is defined on the underside of the flange 14. The mating surface 16 contacts and mates with a portion of the endwall 26 of cylindrical member 22 surrounding the bore 28 when the cylindrical body 12 of the insert 10 is inserted into the bore 28 of cylindrical member 22.

To weld the insert 10 to the cylindrical member 22 by a conventional IR fusion-welding technique, the insert 10 would be first aligned coaxially with the bore 28 of the cylindrical member 22 in a spaced-apart relation with respect to the cylindrical member 22, and the insert 10 would be oriented as it would be disposed within the cylindrical member 22. An infrared heating device, such as an IR platen 20, would be positioned between the insert 10 and the cylindrical member 22, and the mating surface 16 and end wall 26 would be subjected to IR radiation until sufficiently wetted. Next, the IR platen 20 would be removed and the insert 10 would be inserted into the cylindrical member 22 until the mating surfaces 16 and 26 contact one another and fuse together as the thermoplastic cools.

Problems arise here, however, because of the non-coplanar geometry of the insert 10. The mating surface 16 of the insert 10, which needs to be heated, is recessed relative to a bottom surface 30 of the insert 10, which is actually closer to platen 20 than the mating surface 16. If the mating surfaces 26, 16 of the cylindrical member 22 and the insert 10 were to be irradiated, the end surface 30 of the insert 10 would melt before the mating surface 16 is sufficiently heated and wetted, thus rendering the mating surface 16 essentially inaccessible to the radiation of the IR platen 20. Therefore, IR fusion welding is not a practical option for welding such an insert into a cylindrical member. Thus, to attach the insert 10 into the cylindrical member 22, one skilled in the art would heretofore have resorted to other, less desirable welding techniques, such as spin-welding.

Other problems attendant to conventional IR fusion welding techniques and other thermoplastic welding techniques, such as spin welding, arise when a welded thermoplastic assembly includes more than two components welded together. After the first two components of the assembly are welded together, structural and geometrical interferences created by the two connected components can make it difficult to weld subsequent components to the assembly.

Accordingly, while IR fusion welding provides certain advantages over other thermoplastic welding techniques, geometrical or other limitations can make it impracticable to employ IR fusion welding to connect two or more thermoplastic components to form a thermoplastic assembly.

SUMMARY OF THE INVENTION

An object of the present invention, therefore, is to overcome the disadvantages associated with conventional IR and other thermoplastic welding techniques by providing methods of IR fusion-welding thermoplastic members having complex, non-coplanar geometries and methods of IR fusion welding assemblies of more than two components in a single fusion welding step and to provide a thermoplastic assembly fabricated using such methods. Thus, this object is achieved in accordance with the principles of the present invention by providing a fusion-welded thermoplastic assembly which comprises a first thermoplastic element, a second thermoplastic element connected to the first thermoplastic element at an edge of the first thermoplastic element; and a thermoplastic fusion element disposed at a junction of the edge and a portion of the second thermoplastic element. A portion of the thermoplastic fusion element is fused to the edge of the first thermoplastic element proximate the junction and another portion of the thermoplastic fusion element is fused to the second thermoplastic element proximate the junction so that the first and second thermoplastic elements are held together at the junction by the thermoplastic fusion element.

In one preferred embodiment of the invention, the second thermoplastic element comprises a thermoplastic tubular filter housing having a radially-extending wall with an opening formed therein, the first thermoplastic element comprises a thermoplastic insert having a body portion sized and shaped to fit within the opening and having an outwardly extending peripheral flange. The edge of the first thermoplastic element is the peripheral edge of the flange. The insert is recessed into the opening of the tubular housing with the flange engaging the radially-extending wall of the tubular housing adjacent the opening. The thermoplastic fusion element comprises a thermoplastic sealing ring, and a portion of the thermoplastic sealing ring is fused to the thermoplastic insert, proximate the peripheral edge of the flange, and another portion of the thermoplastic sealing ring is fused to a portion of the radially-extending wall of the tubular housing to connect the insert to the tube.

In another preferred embodiment of the invention, the first thermoplastic element comprises a thermoplastic filter housing defining an interior space and having an edge at one end thereof, and the second thermoplastic element comprises a thermoplastic filter element disposed within the interior space of the thermoplastic filter housing and having an edge at one end thereof. The thermoplastic filter element is disposed so that the edge of the thermoplastic filter element is in close proximity to the edge of the thermoplastic filter housing. The thermoplastic fusion element comprises a connector fitting having a connecting section at one end thereof. A portion of the connecting section of the connector fitting is fused to a portion of the edge of the thermoplastic filter housing, and another portion of the connecting section is fused to the edge of the filter element to connect the filter housing, the filter element, and the connector fitting together.

The object of the present invention is further achieved in accordance with the principles of the present invention by providing a method of constructing a thermoplastic assembly of at least a first and a second thermoplastic element. The method comprises the steps of placing the first thermoplastic element in an assembled position with respect to the second thermoplastic element with an edge of either the first or second thermoplastic elements disposed in close proximity to a portion of the other of the first and second thermoplastic elements to form a junction with the portion of the other thermoplastic element. A portion of the junction constitutes a fusion junction at which the first and second thermoplastic elements are connected to one another. A thermoplastic fusion element having portions constructed and arranged to be engaged with the fusion junction is provided, and the first and second thermoplastic elements are heated at the fusion junction and the portions of the thermoplastic fusion element to be engaged with said fusion junction are heated to a molten state. The molten portion of the fusion element are pressed into the molten portion of the fusion junction while permitting the molten portions of the fusion element and the fusion junction to cool to cause a portion of the fusion element to fuse to the edge of the one thermoplastic element proximate the fusion junction and to cause another portion of the fusion element to fuse to the portion of the other thermoplastic element proximate the fusion junction.

Connecting two or more thermoplastic elements together using a separate thermoplastic fusion element eliminates the need to irradiate mating surfaces that may be inaccessible to the IR heating device. Rather than heating and wetting the mating surfaces of the two or more thermoplastic elements, the thermoplastic fusion element is heated and wetted and portions of the two elements that are adjacent to each other and can be simultaneously engaged by the thermoplastic fusion element are also heated and wetted. The respective wetted portions of the thermoplastic fusion element and the thermoplastic elements are engaged with each other to fuse the fusion element to thermoplastic elements, thus connecting the thermoplastic elements together via the thermoplastic fusion element. The thermoplastic fusion element may be a structure whose only function is to fuse the first and second thermoplastic elements together, or the thermoplastic fusion element may itself be a component having a function within the thermoplastic assembly.

Other objects, features, and characteristics of the present invention will become apparent upon consideration of the following description and the appended claims with reference to the accompanying drawings, all of which form a part of the specification, and wherein like reference numerals designate corresponding parts in the various figures.

DESCRIPTION OF THE PRESENTLY PREFERRED EXEMPLARY EMBODIMENTS

Figure 1:
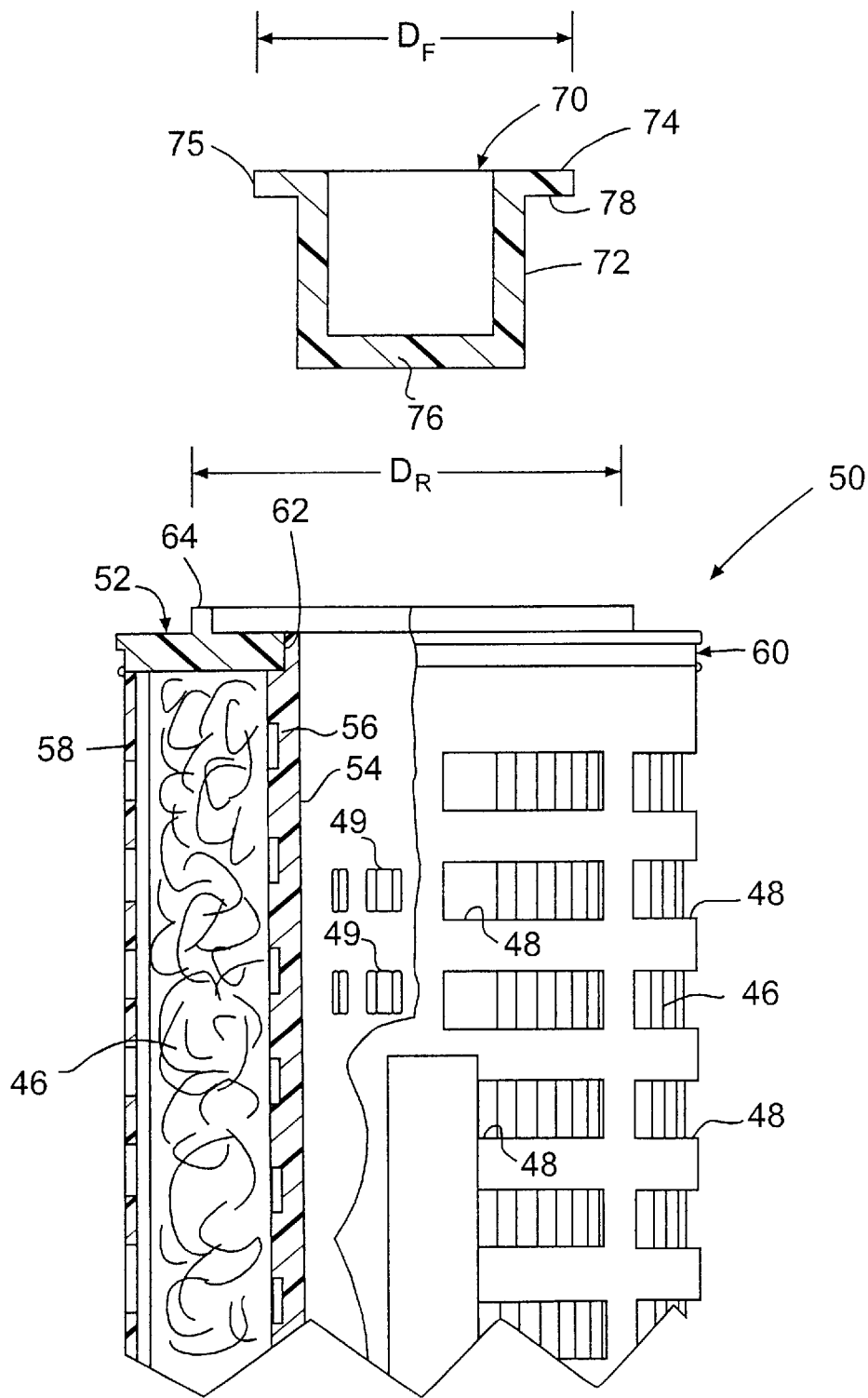
FIG. 1 is a partial side elevation, partially sectioned, of two thermoplastic members of a filter assembly to be connected together as a fusion welded thermoplastic assembly in accordance with principles of the present invention.
Figure 2:
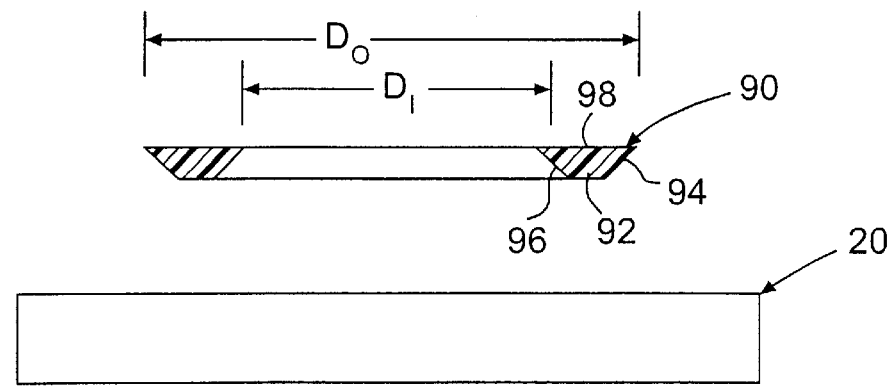
FIG. 2 is a side elevation, partially sectioned, of the two components of FIG. 1 operatively coupled to one another and a thermoplastic fusion ring with a heater platen disposed therebetween, illustrating the method of the present invention.
Figure 2:
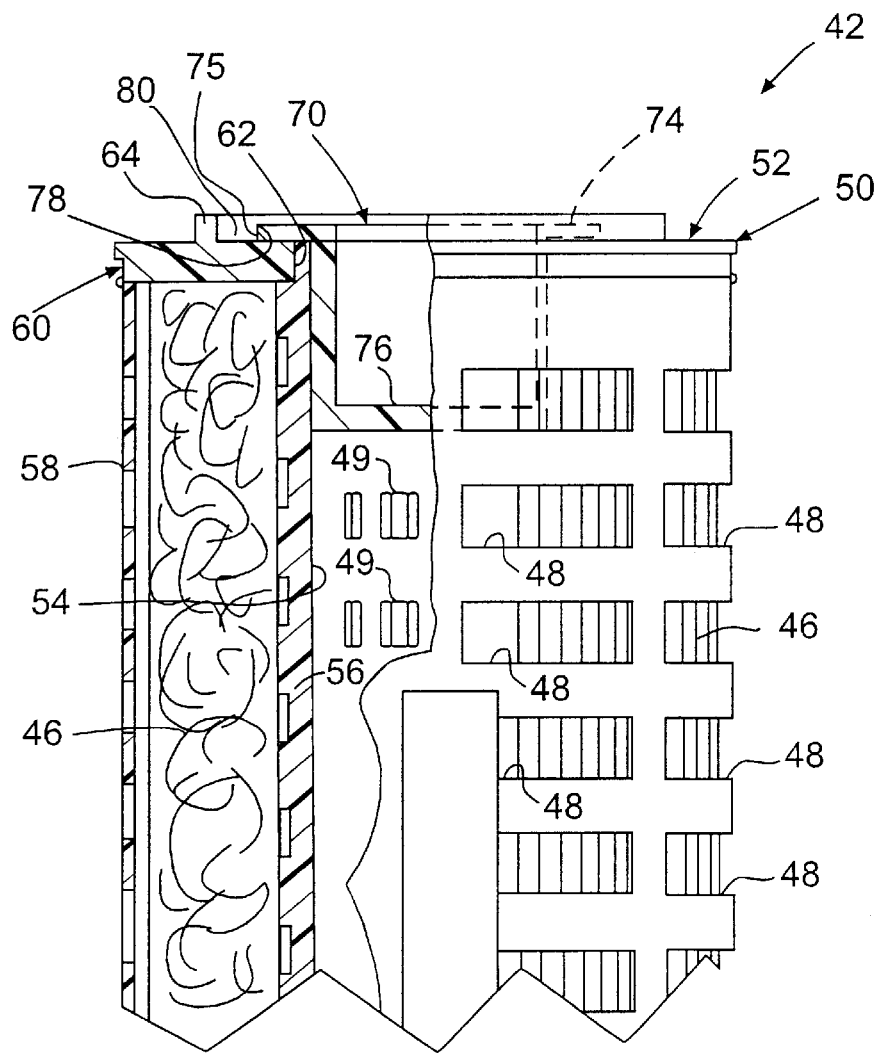
Figure 3:
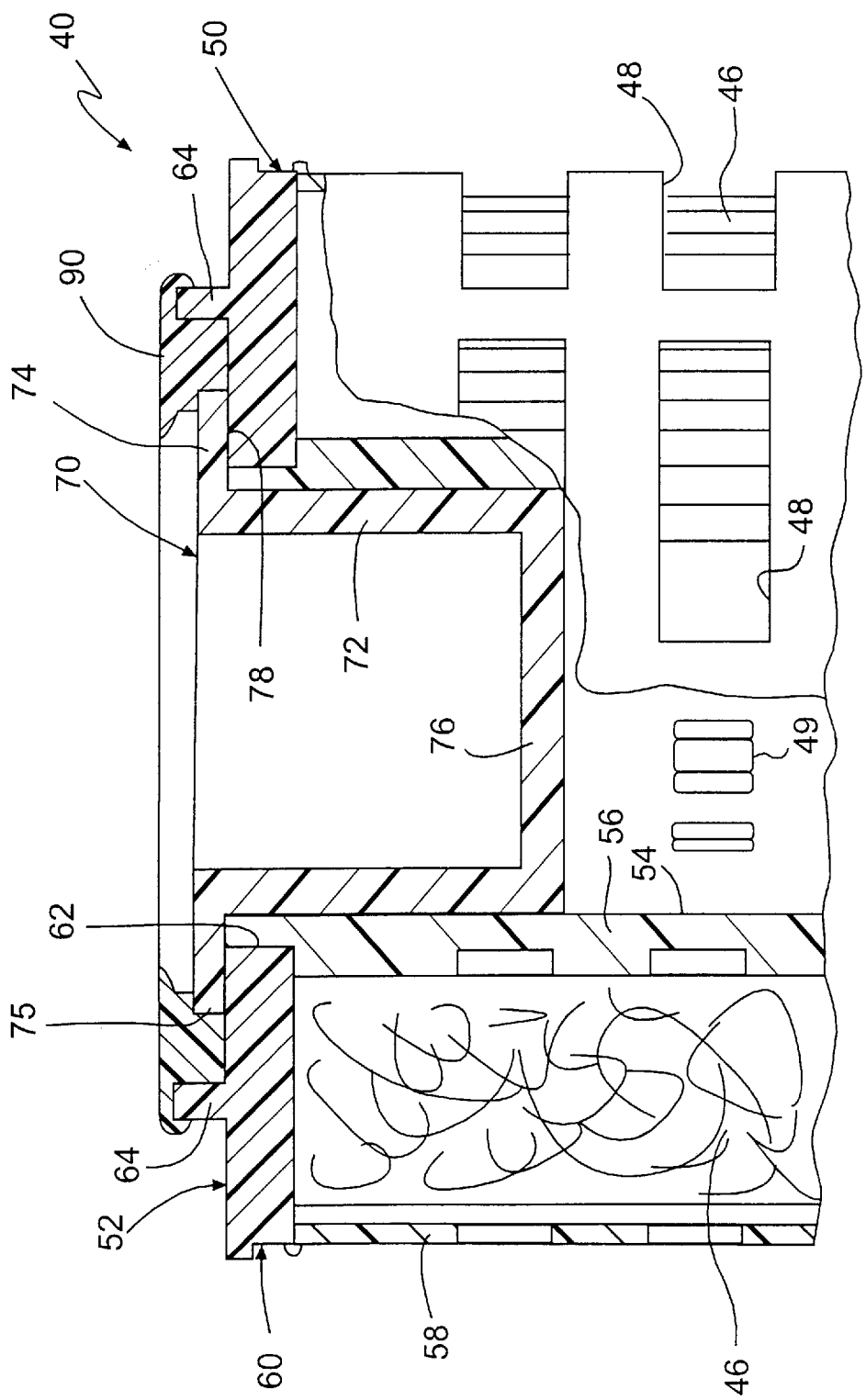
FIG. 3 is a side elevation, partially sectioned, of the two components of FIG. 1 connected to one another by the thermoplastic fusion element to form a thermoplastic fusion assembly according to the present invention.

A fusion-welded thermoplastic assembly according to a first embodiment of the present invention is designated generally by reference number 40 in FIG. 3, and the individual components of the assembly 40 and method of assembling the same are shown in FIGS. 1 and 2. The fusion-welded thermoplastic assembly 40 and method of forming the same are illustrated in FIGS. 1–3 in terms of the construction of a fluid filter assembly. The fusion-welded thermoplastic assembly and method of making the same are not to be limited, however, to applications involving filter assemblies.

In the preferred arrangement of the first embodiment, as shown in FIGS. 1–3, the assembly includes: a first thermoplastic element 50; a second thermoplastic element 70 configured to be cooperable with the first thermoplastic element 50 in a mating relation therewith so that the first and second thermoplastic elements 50, 70 can be connected to one another; and a thermoplastic fusion element 90 fused to the first thermoplastic element 50 and second thermoplastic element 70 for attaching the second thermoplastic element 70 to the first thermoplastic element 50, as will be described below.

The term "thermoplastic", as used in the specification and claims, refers in general to any fusion-weldable polymer material, and may comprise, for example, materials such as polyethylene, perfluoroalkoxy, hexafluoropropylene, polypropylene, and polyvinyldifluoride.

In the fusion-welded thermoplastic assembly 40 according to the first illustrative embodiment of the present invention shown in FIGS. 1–3, the first thermoplastic element 50 is a hollow thermoplastic filter housing having a radially-extending end wall 52 with a bore 54 formed through the housing and the end wall 52. The second thermoplastic element 70 of the first embodiment is a thermoplastic insert having a cylindrical body 72 selectively sized to fit inside the bore 54 of the filter housing 50 and a peripheral flange 74 extending radially outwardly from the cylindrical body 72 of the thermoplastic insert 70. The insert 70 of the illustrated embodiment includes a closed bottom end 76, but the insert may be open in other applications. The thermoplastic fusion element 90 is a sealing ring having an inner diameter $D_I$ and an outer diameter $D_O$ selectively sized so that the inner diameter $D_I$ is smaller than a diameter $D_F$ of an outer-most peripheral edge 75 of the flange 74 of the thermoplastic insert 70 and the outer diameter $D_O$ is greater than the diameter $D_F$ Of the outer-most peripheral edge 75 of the flange 74 of the thermoplastic insert 70.

The hollow thermoplastic filter housing 50 further comprises an inner cylindrical member 56, which defines bore 54, and an outer cylindrical member 58. Provided between these inner and outer cylindrical members 56, 58 of the illustrative filter housing 50 shown in FIGS. 1–3 is fibrous filter material 46. Fluids to be filtered by the filter assembly 40 pass through the filter material 46 between the inner bore 54 and the outer surface of the cylinder through slots 48, 49 formed in the outer cylindrical member 58 and the inner cylindrical member 56, respectively.

In the filter housing 50 illustrated in FIGS. 1–3, the end-wall 52 of the filter housing 50 comprises an end cap designated generally by reference number 60. The end cap 60 includes a circular aperture 62 formed centrally therein which receives an axial end of inner cylindrical member 56 and is connected to the inner cylindrical member 56 at the periphery of aperture 62. End cap 60 is connected at its outer periphery to an axial end of outer cylindrical member 58. The end cap 60 may be attached to the inner and outer cylindrical members 56, 58 by fusion-welding or other thermoplastic connecting technique, such as spin-welding or contact-welding. The end cap 60 may also be integrally formed with the inner cylindrical member 56 and/or the outer cylindrical member 58. It is further preferable that the end cap 60 have a ridge structure 64 extending axially from the outer surface of the end cap 60 and that the ridge structure 64 define a circle that is generally concentric with the aperture 62. A more detailed description of the ridge structure 64 and its function is provided below.

As shown in FIG. 2, in which the thermoplastic insert 70 is inserted into the bore 54 of the thermoplastic housing 50 to form an intermediate assembly generally designated by reference number 42 in FIG. 2., a bottom surface 78 of the flange 74 of the thermoplastic insert 70 rests on the outer surface of the end cap 60. Further, the ridge structure 64 is arranged in a spaced-apart relation with respect to the outer-most peripheral edge 75 of the flange 74 of the thermoplastic insert 70 inserted into the bore 54 of the housing 50. That is, the diameter $D_R$ of the ridge structure 64 is greater than the diameter $D_F$ of the outer-most peripheral edge 75 of the flange 14. Accordingly, an annular trough 80 is formed between the ridge structure 64 and the outer periphery 75 of the flange 74 of the thermoplastic insert 70.

As noted above and shown in FIG. 2, the sealing ring 90 has an inner diameter $D_I$ and outer diameter $D_O$. The inner diameter $D_I$ of the sealing ring 90 is sized so that the sealing ring 90 contacts at least the outer-most peripheral edge 75 of the thermoplastic insert 70 when the sealing ring 90 is engaged with the insert 70. The outer diameter $D_O$ of the sealing ring 90 is sized so that it is greater than the outer-most peripheral edge 75 of the thermoplastic insert 70, thereby ensuring that the sealing ring 90 overlaps the flange 74 and, therefore, also contacts the end wall 52 (i.e., the outer surface of end cap 60) of the filter housing 50 when the ring 90 is engaged with the intermediate assembly 42. Therefore, the sealing ring 90 contacts both the housing 50 and the thermoplastic insert 70. In the most preferred embodiment, the outer diameter $D_O$ of the ring 90 is such that the ring 90 substantially fills the trough 80 when the ring 90 is fused to the insert 70 and housing 50.

As shown in FIG. 2, the sealing ring 90 includes an upper surface 98 and a lower surface 92 that is generally parallel to upper surface 98. Inner peripheral edge 96 and outer peripheral edge 94 are beveled from the upper surface 98 to the lower surface 92, thus defining a lower surface 92 that is generally narrower than the upper surface 98.

The method of fabricating the thermoplastic fusion assembly 40 by fusing the fusion element 90 to the first thermoplastic element, i.e., the filter housing 50, and to the second thermoplastic element, i.e., the thermoplastic insert 70, is shown with particular reference to FIGS. 2 and 3. To fabricate the IR fusion-welded thermoplastic assembly 40 according to the first embodiment, the thermoplastic insert 70 is first inserted into the bore 54 of the filter housing 50 to construct the intermediate assembly 42. The bottom, mating surface 78 of the flange 74 engages a portion of the outer surface of end cap 60 of the housing 50. If an end cap 60 having a ridge structure 64 is provided, then the flange 74 and the ridge structure 64 form the trough 80 for receiving the sealing ring 90. The peripheral edge 75 of the flange 74 and a portion of the outer surface of end cap 60 adjacent peripheral edge 75 define a junction between the insert 70 and the housing 50.

After the thermoplastic insert 70 is inserted into the bore 54 of the housing 50, the sealing ring 90 is coaxially aligned with the housing 50 and the thermoplastic insert 70 of the intermediate assembly 42 in a spaced-apart relation with respect thereto, as shown in FIG. 2. A heater platen 20, preferably an infrared (IR) device, is placed between the sealing ring 90 and the intermediate assembly 42. The IR heater 20 platen then heats the bottom surface 92 and the beveled outer and inner edges 94, 96 of the sealing ring 90. At the same time, the IR heater platen 20 also irradiates the ridge structure 64, the flange 74, including outer peripheral edge 75, and the outer surface of end cap 60, including the portion of end cap 60 within the trough 80, (collectively "welding surfaces" including the bottom surface 92 of the sealing ring 90). These portions of the end cap 60, the thermoplastic insert 70, and the sealing ring 90 are heated until molten and reach a state known in the art as "wetted". Typically, for a thermoplastic material to be welded in a molten state, the material is preferably heated to about 1,140° F.

After the welding surfaces are sufficiently wetted, the IR platen 20 is removed and the sealing ring 90 is pressed onto the junction of the flange 74 of the thermoplastic insert 70 and the end cap 60 of the housing 50. Due to the selectively sized inner and outer diameters, $D_I$, $D_O$, the sealing ring 90 contacts both a portion of the flange 74 and a portion of the end cap 60 of the housing 50. Thus, the molten portions of the welding surfaces intermix with one another and create a thermoplastic material interface as the material cools. The ring 90 is thereby connected to both the end cap 60 of the housing 50 and to the flange 74 of the insert 70, thereby connecting the insert 70 to the housing 50.

A preferable compression force with which the sealing ring 90 is pressed onto the housing 50 and insert 70 is 50 psi. The compression force is preferably maintained for 10–20 seconds, and a preferred cooling time, once the sealing ring 90 has been pressed onto the housing 50 and insert 70, is also 20 seconds.

The narrow bottom surface 92 and the beveled edges 96, 94 of ring 90 facilitate insertion of the ring 90 into the trough 80. The ring 90 is preferably sufficiently wetted, and the compression force employed to compress ring 90 into the trough 80 is preferably sufficient to cause the lower portions of the ring to flow, to substantially completely fill the trough 80, as shown in FIG. 3. Accordingly, the ridge structure 64, and the trough 80 defined thereby prevent the ring 90 from flowing too far from the flange 74 when the wetted ring 90 is pressed into the trough 80. In addition, as shown in FIG. 3, the ring 90 preferably has a thickness that is somewhat greater than the height of the ridge structure 64 so that, as the ring 90 is pressed into the trough 80 by a pressing device (not shown), the pressing device wont contact the top of the ridge structure 64 before the ring is fully pressed to the bottom of the trough.

In the illustrated embodiment, the fusion element comprises the continuous sealing ring 90 which covers the entire junction between the flange 74 and the outer surface of the end cap 60 of the housing 50. Thus, the entire junction comprises a fusion junction at which the housing 50 is fused to the insert 70 via the ring 90. The fusion element may, however, comprise one or more arcuate sectors of a complete ring and may cover only portions of the junction between flange 74 and the outer surface of the end cap 60. Thus, only a discrete portion of the junction comprises a fusion junction at which the housing 50 is fused to the insert 70 via the fusion element.

Figure 4:
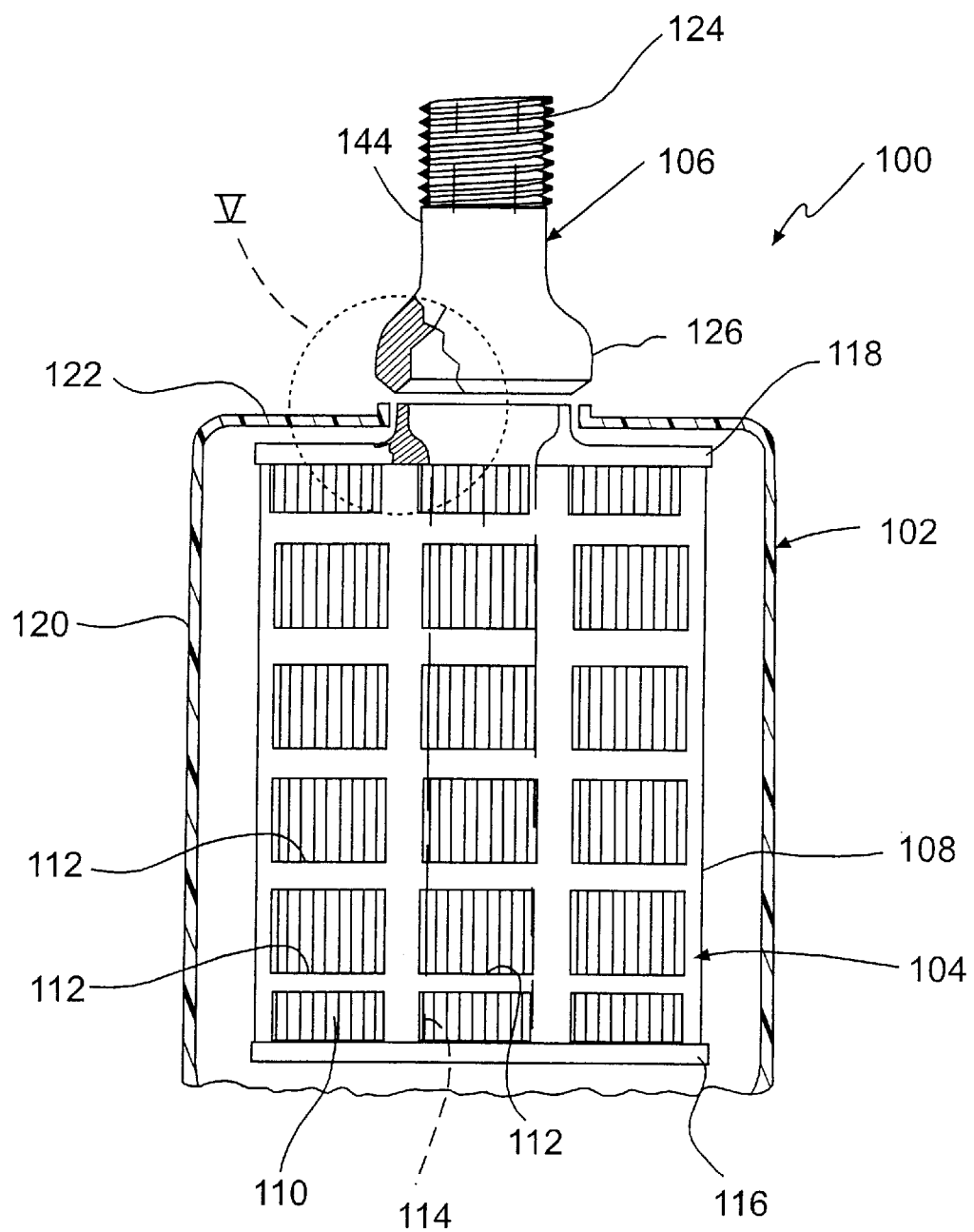
FIG. 4 is a side elevation, partially sectioned, of three components of a filter cartridge assembly to be connected together as a fusion-welded thermoplastic assembly in accordance with principles of the present invention.

A filter assembly illustrating a second exemplary embodiment of the fusion-welded thermoplastic assembly of the present invention is designated generally by reference number 100 in FIG. 4. In the illustrated embodiment, the filter assembly 100 includes a thermoplastic filter housing 102, a filter element 104 housed within the filter housing 102, and a thermoplastic connector fitting 106 to be attached to one end of the filter housing 102 and to one end of the filter element 104. One or more additional connector fittings, similar to connector fitting 106, may be attached to other portions, such as an opposite end, of the filter housing 102.

The filter element 104 includes a thermoplastic filter element outer housing 108 which houses therein a filter medium 110. An inner bore 114 extends through the filter element 104. The filter element 104 is closed at one end by an end cap 116 attached to the end of the filter element outer housing 108. An open end cap 118 is attached to an opposite end of the filter element outer housing 108 and has formed therein a flared opening 138 (see FIG. 5). End caps 116 and 118 are preferably thermoplastic. Outer slots 112 are formed in the filter element outer housing 108 and inner slots (not shown) are formed in the wall of the inner bore 114 to permit fluid to flow through the filter medium 110 into or out of the bore 114.

The filter housing 102 includes a sidewall portion 120 and an endwall portion 122, in which is formed a centrally located aperture 142.

Connector fitting 106 may include an upper cylindrical portion 144. In the illustrated embodiment, external threads 124 are formed on the end of the cylindrical portion 144 for attaching the filter assembly 100 to another structure in a fluid flow path. An outwardly flared connecting portion 126 extends from the cylindrical portion 144 to the end of the fitting 106.

Figure 5:
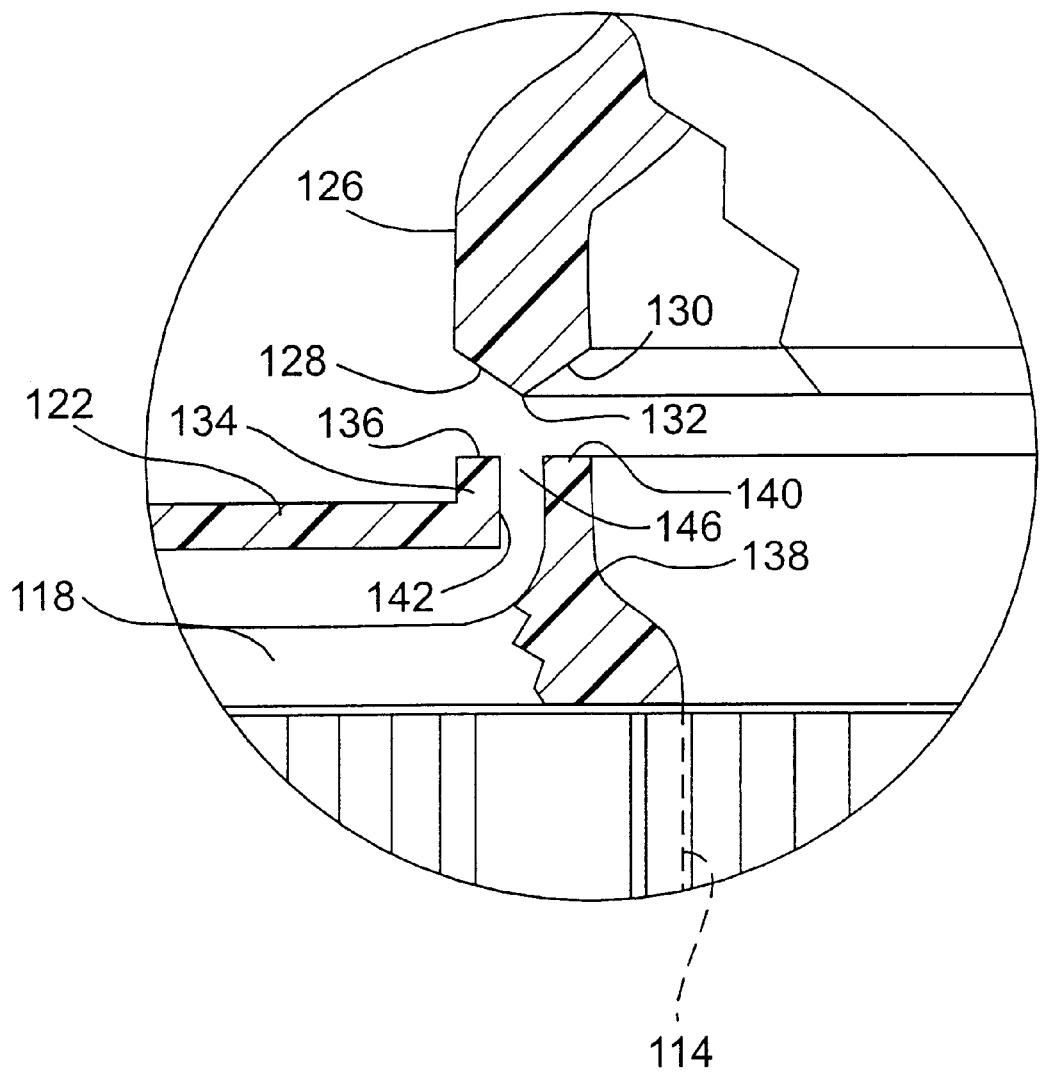
FIG. 5 is an enlarged view of the area within circle "V" in FIG. 4.
Figure 6:
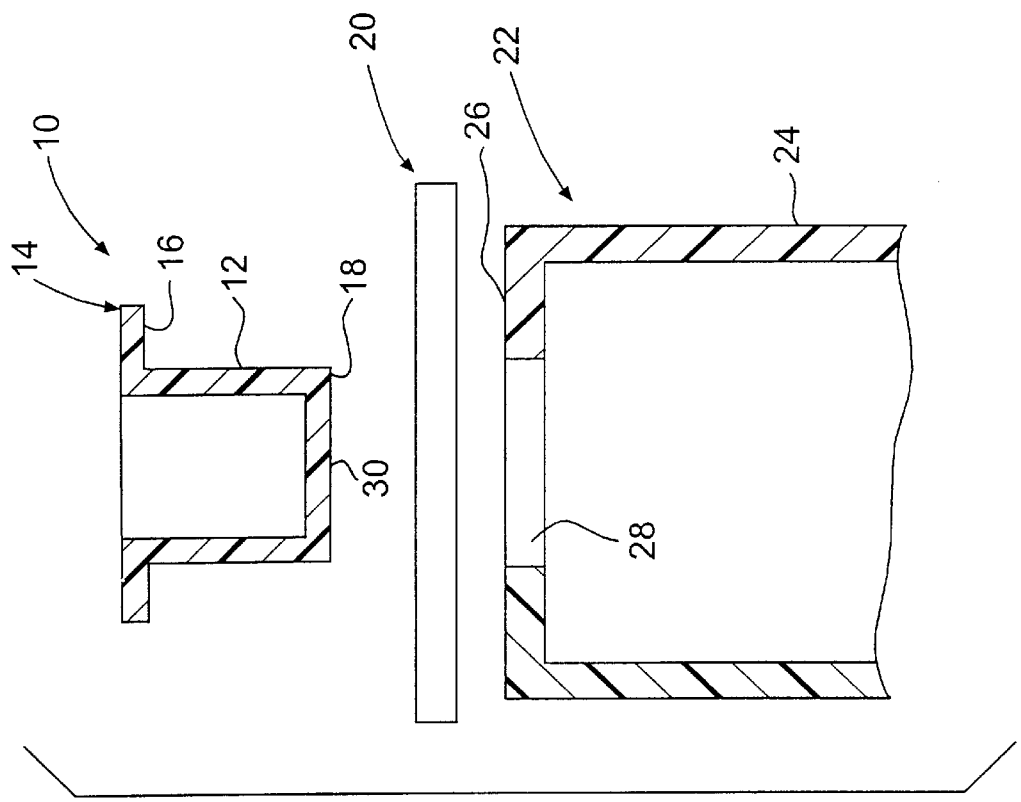
FIG. 6 is a side elevation, in cross-section, illustrating the difficulties encountered in fusion-welding components having mating surfaces that are recessed with respect to other surfaces.

The manner in which the assembly 100 is constructed is best shown in FIG. 5. At a distal end of the outwardly flared connecting portion 126 of the connector fitting 106, the distal end is formed with two oblique beveled portions 128 and 130, which together define a circular knife edge 132. An outwardly turned end 134 is formed about the periphery of the central opening 142 of the endwall portion 122 of the filter housing 102. The outwardly turned end 134 defines an axially-facing annular edge 136. The distal end of the outwardly flared opening 138 of the open end cap 118 of the filter element 104 defines an axially-facing annular edge 140. The filter housing 102, the filter element 104, and the connector fitting 106 are arranged so that the annular edge 140 of the filter element 104, the annular edge 136 of the filter housing 102, and the knife edge 132 of the connector fitting 106 are all generally coaxial with each other and the filter element 104 is disposed inside the filter housing 102. The filter housing 102 and the filter element 104 are sized and arranged to provide a gap 146 between the annular edges 136 and 140. The connector fitting 106 is sized and arranged so that the circular knife edge 132 is generally aligned with the gap 146. A jig (not shown) is preferably provided for holding the filter housing 102 and the filter element 104 in their proper respective positions until the full assembly has been constructed.

To construct the assembly 100, the distal ends of the filter housing 102, filter element 104, and connector fitting 106 are heated, such as by an IR platen (not shown in FIGS. 4 and 5), until the annular edges 136, 140, and the beveled surfaces 128, 130, and the knife edge 132 are all sufficiently wetted. After the respective surfaces are wetted, the heat source is removed and the connector fitting 106 is pressed into the filter housing 102 and filter element 104, with beveled surface 128 contacting and fusing to the annular edge 136 and the beveled surface 130 contacting and fusing to the annular edge 140. The beveled surfaces 128 and 130 and the knife edge 132 help ensure that the connector fitting 106 is properly oriented with respect to the filter housing 102 and filter element 104. The components are held together with sufficient pressure for a sufficient time until the thermoplastic material has cooled to create a thermoplastic fusion interface between the filter housing 102 and the connector fitting 106 and between the filter element 104 and the connector fitting 106, thereby connecting the filter housing 102, filter element 104, and connector fitting 106 together as a single assembly 100.

These welding surfaces are heated to a molten state, preferably heated to 1,140° F. until they are sufficiently wetted. Once the welding surfaces are sufficiently welded, the nozzle is pressed onto the welding surfaces of the filter cartridge and capsule casing. Preferably, the nozzle is pressed with the compression force of 50 psi. for preferably about 20 seconds. To complete the process, the capsule assembly is cooled for another 20 seconds.

Thus, the entire assembly 100 is constructed in a single fusion welding step, the connector 106 serving as a thermoplastic fusion element for connecting the housing 102 to the filter element 104. Moreover, it can be appreciated that if either the filter housing 102 or the filter element 104 were first connected to the connector 106 in an intermediate, subassembly step, it would be difficult to connect the remaining one of the filter housing 102 and filter element 104 to the intermediate subassembly by IR fusion welding. Thus, the one-step, three-piece fusion welding technique of the present invention simplifies the construction of the assembly 100.

The fusion element itself may be a functional component of the overall assembly, as in the second exemplary embodiment shown in FIGS. 4 and 5, or the fusion element may be a nonfunctional component whose only function is to secure the first and second thermoplastic elements together, as in the first exemplary embodiment shown in FIGS. 1–3.

While the invention has been described in connection with what is presently considered to be the most practical and preferred embodiment, it is to be understood that the invention is not to be limited to the disclosed embodiments, but on the contrary is intended to cover in various modifications and equivalent arrangements included within the spirit and scope of the appended claims. Thus, it is to be understood that variations in particular shape, configuration and materials employed as well as temperature and compression force specification can be made without departing from the novel aspects of this invention as described in the claims.

What is claimed is:

1. A fusion-welded thermoplastic assembly comprising:
   a first thermoplastic element comprising a thermoplastic tube having a radially-extending wall with an opening formed therein and a filter medium contained therein,
   a second thermoplastic element connected to said first thermoplastic element and comprising a thermoplastic insert having a cylindrical cup-shaped body portion sized and shaped to fit within said opening and having an outwardly extending peripheral flange, said thermoplastic insert being recessed into the opening of said thermoplastic tube with said flange engaging said radially-extending wall of said thermoplastic tube adjacent said opening, and
   a thermoplastic fusion element comprising a thermoplastic sealing ring, a portion of said thermoplastic sealing ring being fused to said thermoplastic insert, proximate an outer-most edge of said flange, and another portion of said thermoplastic sealing ring being fused to a portion said radially-extending wall of said thermoplastic tube to connect said thermoplastic insert to said thermoplastic tube.

2. The fusion-welded thermoplastic assembly of claim 1, wherein said first and second thermoplastic elements and said thermoplastic fusion element are composed of a material selected from the group consisting of polyethylene, perfluoroalkoxy, hexafluoropropylene, polypropylene, and polyvinyldifluoride.

3. The fusion-welded thermoplastic assembly of claim 1, wherein a portion of said second thermoplastic element is arranged in an overlapping relation with respect to a portion of said first thermoplastic element.

4. The fusion-welded thermoplastic assembly of claim 1, wherein said edge of said peripheral flange defines a circular shape, said second thermoplastic element overlaps said first thermoplastic element, and said thermoplastic sealing ring is circular in shape.

5. The fusion-welded thermoplastic assembly of claim 1, wherein said first thermoplastic element includes an upwardly extending ridge structure disposed at a spaced-apart position from said edge of said peripheral flange, said ridge structure and said edge defining a trough for receiving said thermoplastic fusion element.

6. The fusion-welded thermoplastic assembly of claim 1, wherein said thermoplastic tube is cylindrical in shape, said opening is circular, and said body portion of said thermoplastic insert is cylindrical.

7. The fusion-welded thermoplastic assembly of claim 6, wherein said peripheral flange is circular and said thermoplastic insert is arranged in overlapping relation with respect to said thermoplastic tube, and said thermoplastic tube includes a circular ridge structure extending axially from said radially-extending wall and disposed at a spaced-apart position from said edge of said flange of said thermoplastic insert, said ridge structure and said edge defining an annular trough for receiving said thermoplastic sealing ring.

8. The fusion-welded thermoplastic assembly of claim 1, wherein said sealing ring includes a first surface, a second surface generally parallel to said first surface, and inner and outer edge surfaces, said inner and outer edge surfaces being beveled toward one another extending from said first surface to said second surface, so that said first surface is wider than said second surface.

9. The fusion-welded thermoplastic assembly of claim 1, wherein
   said opening is circular and said body portion of said second thermoplastic element is cylindrical in shape with an outer diameter that is less than a diameter of said circular opening which permits said body portion to be inserted into said circular opening;
   said peripheral flange is circular in shape with an outer diameter greater than a diameter of said circular opening; and
   said fusion element is in the form of a circular ring having an inside diameter that is less than the diameter of said flange and an outside diameter that is greater than the diameter of said flange.

* * * * *